(12) United States Patent
Edukulla et al.

(10) Patent No.: US 8,479,297 B1
(45) Date of Patent: Jul. 2, 2013

(54) PRIORITIZING NETWORK ASSETS

(75) Inventors: Santhosh Kumar Edukulla, Ulsoor (IN); Suresh Rajanna, HAL Post (IN)

(73) Assignee: McAfee, Inc., Santa Clara, CA (US)

( * ) Notice: Subject to any disclaimer, the term of this patent is extended or adjusted under 35 U.S.C. 154(b) by 177 days.

(21) Appl. No.: 12/952,787

(22) Filed: Nov. 23, 2010

(51) Int. Cl.
*H04L 29/06* (2006.01)

(52) U.S. Cl.
USPC .......................................... 726/25; 713/188

(58) Field of Classification Search
USPC ........................................................ 726/25
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,279,113 B1 | 8/2001 | Vaidya | |
| 6,460,050 B1 | 10/2002 | Pace et al. | |
| 7,506,155 B1 | 3/2009 | Stewart et al. | |
| 2002/0002563 A1* | 1/2002 | Bendik | 707/500 |
| 2002/0138416 A1* | 9/2002 | Lovejoy et al. | 705/38 |
| 2003/0004688 A1 | 1/2003 | Gupta et al. | |
| 2003/0212779 A1 | 11/2003 | Boyter et al. | |
| 2004/0044912 A1 | 3/2004 | Connary et al. | |
| 2004/0103309 A1* | 5/2004 | Tracy et al. | 713/201 |
| 2004/0137915 A1 | 7/2004 | Diener et al. | |
| 2004/0260945 A1 | 12/2004 | Raikar et al. | |
| 2005/0160480 A1* | 7/2005 | Birt et al. | 726/25 |
| 2006/0010497 A1* | 1/2006 | O'Brien et al. | 726/26 |
| 2006/0130142 A1 | 6/2006 | Mester et al. | |
| 2006/0191012 A1* | 8/2006 | Banzhof et al. | 726/25 |
| 2007/0067846 A1 | 3/2007 | McFarlane et al. | |
| 2008/0060071 A1 | 3/2008 | Hennan et al. | |
| 2011/0302291 A1* | 12/2011 | Draugelis | 709/224 |

OTHER PUBLICATIONS

'Preventsys Introduces Latest Version of Enterprise Security Management' SecurityProNews [online]. [Retrieved on 1 May 18, 2012]. Retrieved from Internet electronic mail: http://www.securitypronews.com/news/securitynews/ spn-45-20040927PreventsysIntroducesLatestVersionofEnterpriseSecurityManagement.html, 2 pages.

"Skybox Risk Control" Skybox Security [online]. [Retrieved on May 18, 2012]. Retrieved from Internet electronic mail: http://www.skyboxsecurity.com/securityrisk, 2 pages.

"Skybox Network Assurance" Skybox Security [online]. [Retrieved on May 18, 2012]. Retrieved from Internet electronic mail: http://www.skyboxsecurity.com/networkcompliance, 2 pages.

"Skybox Firewall Assurance" Skybox Security [online]. [Retrieved on May 18, 2012]. Retrieved from Internet electronic mail: http://www.skyboxsecurity.com/firewallcompliance, 2 pages.

"Skybox Threat Manager" Skybox Security [online]. [Retrieved on May 18, 2012]. Retrieved from Internet electronic mail: http://www.skyboxsecurity.com/products/threat-manager%20, 2 pages.

"Intrusion prevention system" [online]. [Retrieved on May 18, 2012]. Retrieved from Internet electronic mail: http://en.wikipedia.org/wiki/Intrusion_prevention_system, 3 pages.

(Continued)

*Primary Examiner* — Edward Zee
*Assistant Examiner* — Yogesh Paliwal
(74) *Attorney, Agent, or Firm* — Patent Capital Group

(57) ABSTRACT

Methods, systems, and apparatus, including computer programs encoded on computer storage media, for generating composite priority factors. The system automates prioritization of assets based on metrics across many dimensions, allowing security and risk managers to uses a logical framework that is scalable for thousands of assets.

20 Claims, 4 Drawing Sheets

---

Composite Priority Factor Asset Ranking (Assets 1-10 of 1,250)

| Asset Name | CPF |
|---|---|
| Asset 12345 ("mailserver") | 97.1 |
| Asset 16549 ("webserverA") | 97.0 |
| Asset 16429 ("webserverB") | 92.5 |
| Asset 26430 ("webserverC") | 91.0 |
| Asset 15350 ("mailserverB") | 90.0 |
| Asset 18529 ("mailserverD") | 90.0 |
| Asset 25405 ("webserverD") | 90.0 |
| Asset 16429 ("usercomputer1") | 89.0 |
| Asset 14345 ("usercomputer2") | 89.9 |
| Asset 15420 ("usercomputer3") | 89.8 |

OTHER PUBLICATIONS

"Intrusion detection system" [online]. [Retrieved on May 18, 2012]. Retrieved from Internet electronic mail: http://en.wikipedia.org/wiki/Intrusion_detection_system, 6 pages.

Foundstone's Threat Correlation Module Prioritizes Critical Threats Facing Every Enterprise System [online]. [Retrieved on May 18, 2012]. Retrieved from Internet electronic mail: http://findarticles.com/p/articles/mi_m0EIN/is_2003_Sept_15/ai_107753228/, 4 pages.

"McAfee Vulnerability Manager" [online]. [Retrieved on May 18, 2012]. Retrieved from Internet electronic mail: http://www.it-cube.netlloesungen/it-security/Vulnerability-risk-mgmtlfoundstone/downloadsl? no_cache= 1& tx_abdownloads_pi 1% 5Baction %5D=getviewclickeddown load&tx_abdownloads_pi 1% 5Buid%50=233&tx_abdownloads_pi1%5Bcid%50=1047, 3 pages.

"Foundstone Remediation" [online]. [Retrieved on May 18, 2012]. Retrieved from Internet electronic mail: http://www.it-cube.netl-loesungen/it-security/vulnera bility-risk-mgmtlfoundstone/down-loads/?no_cache=1 &tx_abdownloads_pi1 %5Baction % 5D=getviewclickeddown load&tx_abdownloads_pi 1% SBuid%5D=233&tx_abdown loads_pi 1% SBcid%50=1047,2 pages.

"Foundstone Threat Correlation Module" [online]. [Retrieved on May 18, 2012]. Retrieved from Internet electronic mail: http://www.it-cube.netlloesungen/it-security/vulnerability-risk-mgmtlfoundstone/downloads/?no_cache= 1& tx_abdownloads_pi 1% 5Baction %5D=getviewclickeddownload&tx_abdownloads_pi 1% 5Buid%50=233&tx_abdownloads_pi1%5Bcid%50=1047, 4 pages.

"Complete Risk Management" [online]. [Retrieved on May 18, 2012]. Retrieved from Internet electronic mail: http://www.it-cube.netlloesungen/it-security/Vulnerability-risk-mgmtlfoundstone/down loadsl?no cache= 1 &tx abdownloads pi 1 %5Baction % 5D=getviewclickeddown load&tx_abdownloads_pi 1% 5Buid%5D=233&tx_abdown loads_pi 1% 5Bcid%50=1047.7 pages.

"Release Notes for McAfee Vulnerability Manager 7.0.0" [online]. [Retrieved on May 18, 2012]. Retrieved from Internet electronic mail: http://www.it-cube.netlloesungen/it-security/Vulnerability-risk-mgmtlfoundstone/downloadsl? no cache= 1& tx_abdownloads_pi 1% 5Baction %5D=getviewclickeddown load& tx_abdownloads_pi 1% 5Buid%5D=233&tx_ abdownloads_pi1%5Bcid%50=1047. 6 pages.

Wood et al., Jam: A Jammed-Area Mapping Service for Sensor Networks, Dec. 2003, Proceedings of the 24th IEEE International Real-Time Systems Symposium 2003, pp. 286-297.

\* cited by examiner

Composite Priority Factor Asset Ranking (Assets 1-10 of 1,250)

| Asset Name ⤴ 402 | CPF ⤴ 404 |
|---|---|
| Asset 12345 ("mailserver") | 97.1 |
| Asset 16549 ("webserverA") | 97.0 |
| Asset 16429 ("webserverB") | 92.5 |
| Asset 26430 ("webserverC") | 91.0 |
| Asset 15350 ("mailserverB") | 90.0 |
| Asset 18529 ("mailserverD") | 90.0 |
| Asset 25405 ("webserverD") | 90.0 |
| Asset 16429 ("usercomputer1") | 89.0 |
| Asset 14345 ("usercomputer2") | 89.9 |
| Asset 15420 ("usercomputer3") | 89.8 |

PRIORITIZING NETWORK ASSETS

BACKGROUND

This specification relates to prioritizing assets in a system of assets.

An asset is a computer or other electronic device that communicates with other assets over a network, such as a local area network and/or a wide area network. A system of assets can be connected over such networks. For example, a home might have five assets, each of which are networked to each other and connected to the outside world through the Internet. As another example, a business might have three physically separate offices, each of which has many assets. The assets within each office and the assets across the offices can be connected over a network.

Each asset in a system of assets can be at risk from multiple threats at any given time. Each threat corresponds to a potential attack on the asset by a particular virus, malware, and other unauthorized entity. An attack occurs when the unauthorized entity exploits a known vulnerability of the asset in an attempt to access or control the asset. Risks not only come from attacks but also from other actions, such as data leakage (e.g., transmitting sensitive or confiscation information outside a protected network, either intentionally or unintentionally). Most threats have known remediations that, if put in place for an asset, eliminate or reduce the risk that the threat will affect the asset.

Additionally, some assets in a system are subject to compliance requirements. Compliance requirements are requirements for complying with one or more of governmental regulations of regulatory bodies, company regulations of a company, or customer regulators of a customer. Compliance factors are not necessarily security requirements, but may include security measures. For example, servers that store health records may be required to be placed on a private IP network and have access restricted to only certain users. Likewise, secured sessions with the server may be required to comply with certain encryption requirements.

As an enterprise may have many thousands of assets, information technology administrators need to prioritize compliance, vulnerability and remediation processes among the assets. A naïve prioritization scheme can simply list the assets according to asset identifiers, e.g., unique addresses or identifiers of each asset, and each asset can be processed according to its order in the list. However, some assets may be much more critical that others. For example, a mail server is more critical than a guest client computer that has only restricted access to an enterprise network; likewise, a client computer of a user that has access to medical and financial records of patients is more critical than a client computer of a receptionist and which has access to only an e-mail application, a company LDAP server, and a web browser.

Thus, to minimize security and compliance risks, some assets need to be processed before other assets, and some assets need to be processed more often than other assets. However, when faced with thousands of assets, each of which has many different asset factors to account for, information technology administrators cannot feasibly determine a priority scheme without an automated framework.

SUMMARY

In general, one innovative aspect of the subject matter described in this specification can be embodied in a system that includes a data processing apparatus and a computer storage medium coupled to the data processing apparatus and including instructions that when executed by the data processing apparatus causes the data processing apparatus to perform operations comprising: receiving asset identifiers and asset categorizations associated with the asset identifiers, each asset being a network computer processing apparatus, each asset identifier uniquely identifying a corresponding asset, and the categorizations associated with each corresponding asset categorizing the asset as belonging to one or more asset types; receiving dimensional priority factors data for a plurality of dimensional priority factors, each dimensional priority factor including: a dimensional dictionary defining a plurality of classification metrics specific to the dimensional priority factor, each classification metric defining a metric to classify an asset as belonging to a classification; a plurality of dimensional rules for the dimensional priority factor, each dimensional rule defining one or more of the classification metrics and asset specific data for an asset as input and defining an asset factor for the asset based on the input; receiving composite priority factor data, the composite priority factor data including: a plurality of composite rules, each composite rule defining one or more asset factors determined from one or more corresponding dimensional rules as input and defining a composite factor based on the input; and a composite priority factor rule that defines composite factors as input and a composite priority factor based on the input; for each of the assets: for each of the dimensional priority factors, determining corresponding asset factors for the asset based on the dimensional rules, for each of the composite rules, determining composite factors for the asset based on the asset factors for the asset, and determining a composite priority factor for the asset based on the composite factors for the asset; ranking the assets according to their corresponding composite priority factors to define an order by which the assets are to be subjected to one or more security processes. Other embodiments of this aspect include corresponding systems, apparatus, and computer programs recorded on computer storage devices, each configured to perform the operations of the methods.

Systems implementing the subject matter herein may realize any of the following advantages. The system automates prioritization of assets based on metrics across many dimensions, allowing security and risk managers to uses a logical framework that is scalable for thousands of assets. The system can, in some implementations, use pre-existing data from commercially available security and compliance software and services, thus reducing deployment costs. The system allows administrators to determine the most critical assets from the less critical assets, and to apply security and compliance resources to each asset according to the ranking of the asset. The highest ranked assets, once identified, can be further processed for additional security and compliance factors that are resource intensive, thus allocating limited resources to the most important enterprise assets.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 4 is an example user interface presenting the top ranked assets according to the asset prioritization data for the assets.

Like reference numbers and designations in the various drawings indicate like elements.

DETAILED DESCRIPTION

§1.0 Asset System Overview

Figure 1:
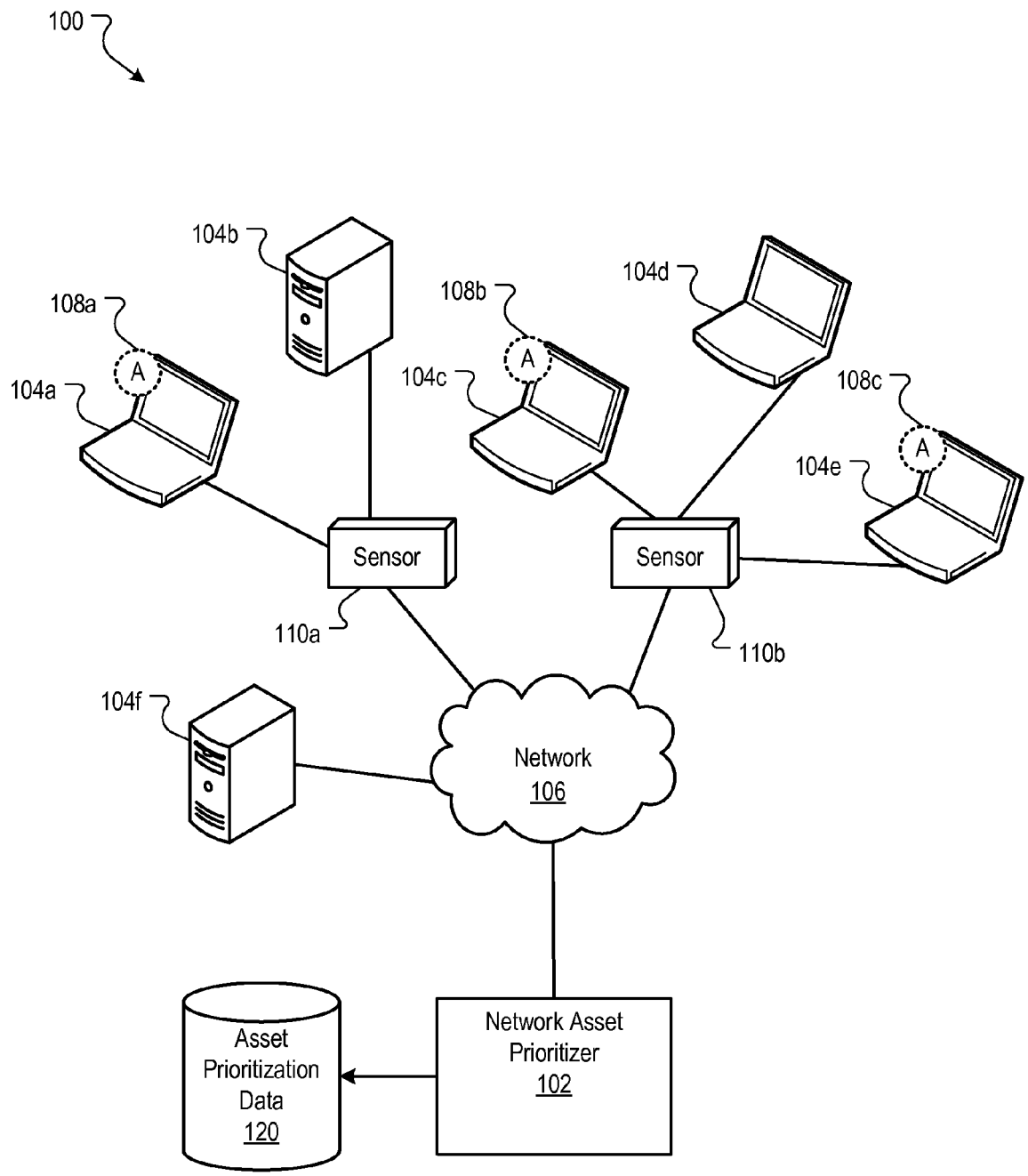
FIG. 1 illustrates an example asset system monitored by a network asset prioritizer.

FIG. 1 illustrates an example asset system 100 monitored by a network asset prioritizer 102. The assets 104 in the system 100 are connected to each other, and optionally to other systems, by a network 106. The assets 104 in the system 100 include client devices 104a, 104c 104d and 104e, and server devices 104b and 104f.

Each asset 104 can be vulnerable to one or more threats. These threats include, for example, viruses, malware, and other software or agents that cause unauthorized attacks. Each asset can be protected by a variety of countermeasures. These countermeasures include passive countermeasures and active countermeasures.

Passive countermeasures are provided by two kinds of sensors: agent-based sensors 108 and network-based sensors 110. The agent-based sensors 108 and the network based sensors 110 monitor the assets themselves and/or network traffic to and from the assets. For illustrative purposes, the sensors are described below as both monitoring the assets and protecting the assets by providing one or more countermeasures. However, the monitoring and countermeasure functionalities do not have to be provided by the same sensor. In the description below, sensor is used to refer to various types of monitoring and protection systems including, for example, firewalls, host intrusion prevention systems, network intrusion prevention systems, network access control systems, intrusion detection systems, intrusion prevention systems, anti-virus software, and spam filters.

The agent-based sensors 108 and the network-based sensors 110 can include one or more passive countermeasures that are part of the sensor. These passive countermeasures are software programs and/or hardware that protect assets from various threats. Each passive countermeasure reduces the risk that a threat will affect an asset. A passive countermeasure protects against a threat by detecting and stopping an attack associated with the threat, by detecting and stopping activities associated with the attack, or by mitigating damage caused by an attack. For example, a passive countermeasure may be configured to detect data having a signature associated with a particular attack, and block data with that signature. As another example, a passive countermeasure may generate back-up copies of particular files targeted by an attack, so that even if the attack attacks the files, the files can be restored. Example passive countermeasures include, but are not limited to, hardware firewalls, software firewalls, data loss prevention systems, web proxies, mail filters, host-based intrusion prevention systems, network-based intrusion prevention systems, rate-based intrusion prevention systems, content-based intrusion prevention systems, intrusion detection systems, and virus detection software.

Passive countermeasures can also be partial countermeasures that do not completely protect from or mitigate the effects of an attack. For example, a partial passive countermeasure might block some, but not all, of the network traffic associated with a particular attack. As another example, if a threat needs either direct physical access or network access to compromise an asset, an example partial passive countermeasure would block network access to the asset, but not physical access.

The agent-based sensors 108 are software-based sensors that are installed on respective assets 104. For example, agent-based sensor 108a is installed on asset 104a, agent-based sensor 108b is installed on asset 104c, and agent-based sensor 108c is installed on asset 104e. The agent-based sensors 108 run various analyses on their respective assets 104, for example, to identify vulnerabilities on the assets 104 or to identify viruses or other malware executing on the assets 104. The agent-based sensors may also provide one or more passive countermeasures for threats, as described above. Example agent-based sensors include antivirus software.

The network-based sensors 110 are hardware devices and/or software in a data communication path between assets 104 protected by the sensor and the network resources that the asset is attempting to access. For example, sensor 110a is connected to assets 104a and 104b, and sensor 110b is connected to assets 104c, 104d, and 104e. While FIG. 1 illustrates a single network-based sensor 110 in a communication path with each asset, other configurations are possible. For example, multiple network-based sensors 110 can be connected to the same asset 104, and some assets 104 may not be connected to any network-based sensors 110.

When an asset 104 tries to send information through the network 106 or receive information over the network 106 through a network-based sensor 110, the sensor analyzes information about the asset 104 and the information being sent or received and determines whether to allow the communication. An example network-based sensor includes one or more processors, a memory subsystem, and an input/output subsystem. The one or more processors are programmed according to instructions stored in the memory subsystem, and monitor the network traffic passing through the input/output subsystem. The one or more processors are programmed to take one or more protective actions on their own, or to query a sensor control system (not shown) and take further actions as instructed by the sensor control system. Example network-based sensors include network access control systems, firewalls, routers, switches, bridges, hubs, web proxies, application proxies, gateways, network access control systems, mail filters, virtual private networks, intrusion prevention systems and intrusion detection systems.

The assets 104 can also be protected by one or more active countermeasures that are applied to the asset. Active countermeasures make changes to the configuration of assets or the configuration of existing passive countermeasures to actively eliminate a vulnerability. In contrast, passive countermeasures hide the effects of a vulnerability, but do not remove the vulnerability. Each active countermeasure eliminates, or at least reduces, the risk that a threat will affect an asset when the active countermeasure is applied to the asset by eliminating, or at least reducing, a vulnerability. An active countermeasure protects against a threat by modifying the configuration of an asset 104 so that the asset is no longer vulnerable to the threat. For example, an active countermeasure can close a back door that was open on an asset or correct another type of system vulnerability. Example active countermeasures include, but are not limited to, software patches that are applied to assets.

The assets 104 may be vulnerable to many different threats at any given time. Some of the assets 104 may be already protected by one or more passive countermeasures, and some of the assets 104 may need to have additional countermeasures put in place to protect the assets from the threats.

Each of the assets 104 may also have one or more compliance requirements. Compliance requirements are requirements for complying with one or more of governmental regulations of regulatory bodies, company regulations of a company, or customer regulators of a customer. Compliance factors are not necessarily security requirements, but may include security measures, as described above.

Each of the assets may also be of a different type. For example, asset 104b may be a mail server, asset 104f may be server that provides access to patient health records and patience financials, asset 104a may be client device of a heath insurance claims specialist, and asset 104d may be a client device of a lobby receptionist.

As will be described in section 2.0 below, there are other factors associated with each asset. As each asset stores and has access to, or is used by users that have access to different types of information, some of which is highly sensitive and some of which is not very sensitive, each asset represents a certain level of security and compliance risk for an organization. The network asset prioritizer 102 is configured to take into account all of the applicable factors for each asset, and generate asset prioritization data 120 that prioritizes the assets. The assets are then ranked according to their priority, and compliance, vulnerability and remediation processes are carried out on the assets according to the prioritized rank of the asset.

The network asset prioritizer 102 is a data processing apparatus of one or more computers, each of which includes one or more processors, a memory subsystem, and an input/output subsystem. The operations the network asset prioritizer 102 is described in more detail below.

§2.0 Asset Prioritization

Figure 2:
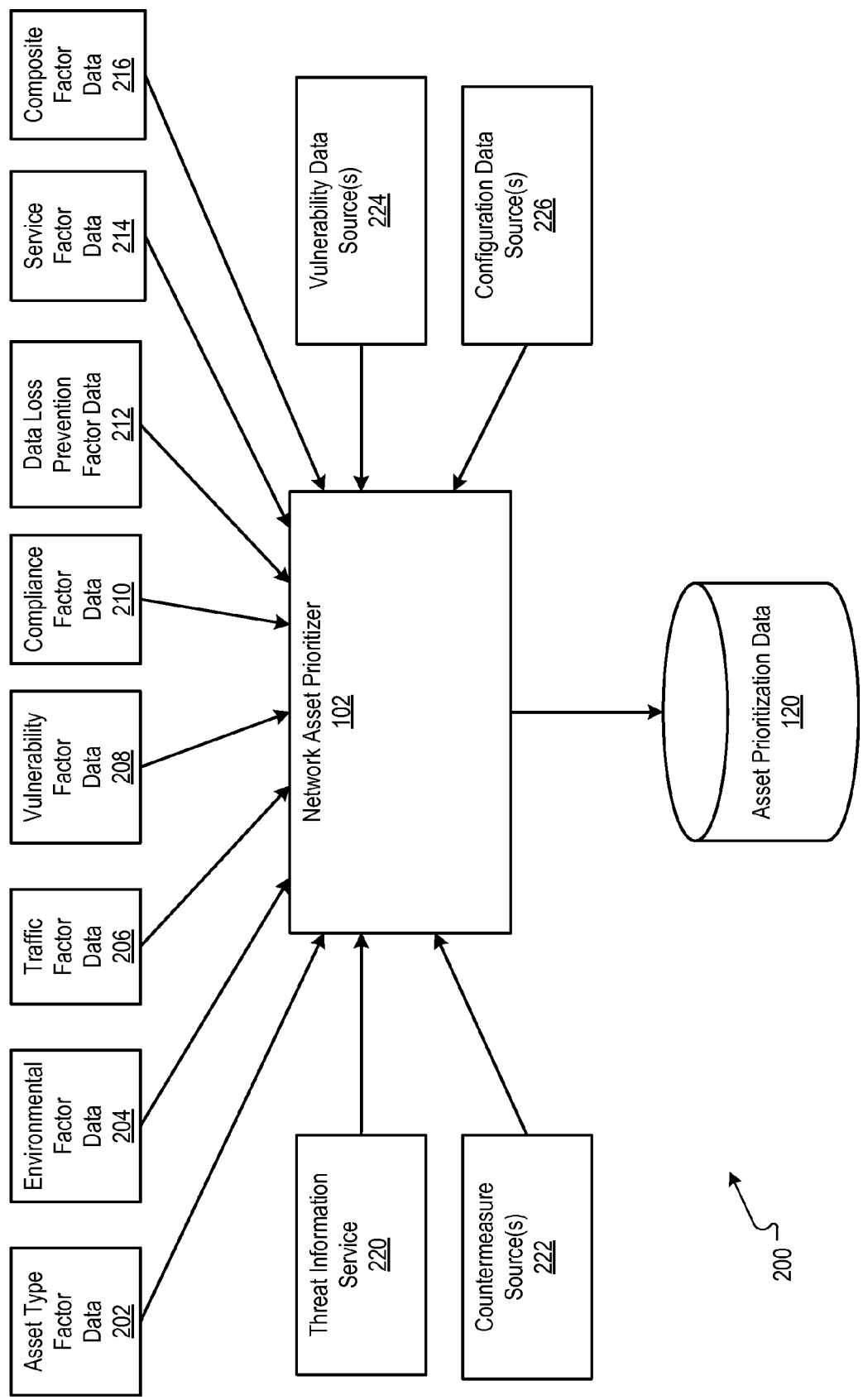
FIG. 2 illustrates an example of the sources of data used by the network asset prioritizer to generate asset prioritization data.

The network asset prioritizer 102 receives data from multiple sources in order to determine an asset priority for an asset. FIG. 2 illustrates an example 200 of the sources of data used by the network asset prioritizer 102 to generate asset prioritization data 120.

The network asset prioritizer 102 receives dimensional priority factor data that defines dimensional priority factors. Examples of such dimensional priority factor data include, but are not limited to, asset type factor data 202, environmental factor data 204, traffic factor data 206, vulnerability factor data 208, compliance factor data 210, data loss prevention factor data 212, and service factor data 214. Each of the dimensional priority factors includes a dimensional dictionary and a dimensional rules. The dimensional dictionary defines classification metrics specific to the dimensional priority factor, and each classification metric defines a metric to classify an asset as belonging to a classification. Each dimensional rule defines one or more of the classification metrics and asset specific data for an asset as input and defines an asset factor for the asset based on the input. Each of the example factors 202-214 are described in more detail in section 2.2 below.

The network asset prioritizer also receives composite priority factor data 216 that includes a composite rules and a composite priority factor rule. Each composite rule defines one or more asset factors determined from one or more corresponding dimensional rules as input and defines a composite factor based on the inputs. The composite priority factor rule defines composite factors as input and a composite priority factor based on the input. The composite priority factor is a final value that is used to rank an asset. The composite priority factor data 216 is described in more detail in section 2.3 below.

Each of the dimensional rules take into account the specific factors of an asset, and, using the dimensional rules, the network asset prioritizer 102 determines which of the various asset factors apply to each asset per each dimensional rule.

The specific factors of each asset are, in some implementations, obtained from asset configuration data from configuration data sources 226, threat definition data from a threat information service 220, vulnerability detection data is received from one or more vulnerability data source(s) 224, and countermeasure detection data received from countermeasure source(s) 222.

§2.1.1 Asset Configuration Data

The asset configuration data is received from one or more configuration data source(s) 226. In some implementations, the configuration data source(s) 226 are one or more data aggregators. A data aggregator is one or more servers that receive configuration data, aggregate the data, and format the data in a format useable by the network asset prioritizer 102. The data aggregators can receive configuration data from the assets themselves or from the sensors monitoring the assets. Example data aggregators include McAfee ePolicy Orchestrator®, available from McAfee of Santa Clara, Calif., Solidcore® products including S3 Control Product Comparison, POS Check & Control, and/or PCI Pro, available form McAfee of Santa Clara, Calif., and Active Directory®, available from Microsoft Corporation of Redmond, Wash. For example, a data aggregator can maintain an asset data repository with details on asset configurations. Examples of asset configuration data include asset identifiers and asset categorizations associated with the asset identifiers. Each asset identifier uniquely identifies a corresponding asset, and the categorizations associated with each corresponding asset categorize the asset as belonging to one or more asset types (e.g., mail server, LDAP server, whether on a public IP or private IP, etc.).

Alternatively, the configuration data source(s) 226 are the assets and/or sensors themselves. When the configuration data source(s) 226 are the assets and/or sensors themselves, the configuration data is not aggregated when it is received by the network asset prioritizer 102, and the network asset prioritizer 102 aggregates the data itself.

The configuration of an asset is a hardware and/or software configuration. Depending on the configuration, various threats may be applicable to an asset. In general, the configuration of the asset can include one or more of the physical configuration of the asset, the software running on the asset, and the configuration of the software running on the asset. Examples of configurations include particular families of operating systems (e.g., Windows™, Linux™, Apple OS™), specific versions of operating systems (e.g., Windows Vista™), particular network port settings (e.g., network port 8 is open), and particular software products executing on the system (e.g., a particular word processor or a particular web server). In some implementations, the configuration data does not include countermeasures in place for the asset, or whether the asset is vulnerable to a particular threat.

§2.1.2 Threat Definition Data

The threat definition data is received from a threat information service 220. The threat information service 220 identifies threats and countermeasures that protect against the threats, and then provides the data to the network asset prioritizer 102. The threat definition data further specifies, for each threat, the countermeasures that protect against the threat.

The threat definition data also includes applicability data for each threat. The applicability data specifies a configuration that an asset must have in order to be vulnerable to the threat. For example, the applicability data can specify that the threat only attacks particular operating systems or particular software products installed on an asset, or that the threat only attacks particular versions of products, or products configured in a particular way.

In some implementations, the threat definition data also specifies which sensors and/or which software products executing on the sensors can detect an attack corresponding to the threat. For example, suppose threat A can attack all machines on a network with a specific vulnerability and that product B can detect the vulnerability when it has setting C. Furthermore, product D provides passive countermeasures that mitigate the effect of the threat. In this case, the threat definition data can specify that threat A attacks all machines, that product B with setting C can detect the vulnerability to the threat, and that product D provides passive countermeasures that protect against the threat.

§2.1.3 Vulnerability Detection Data

The vulnerability detection data is received from one or more vulnerability data source(s) 224. In some implementations, the vulnerability data source(s) 224 are one or more data aggregators. The data aggregators receive vulnerability detection data from individual sensors in the system. The individual sensors can be agent-based sensors and/or network-based sensors. A data aggregator is one or more servers that receive configuration data, aggregate the data, and format it in a format useable by the network asset prioritizer 102. The data aggregators can be the same as, or different from, the data aggregators that are the configuration data source(s). The data aggregators can receive vulnerability data from the assets themselves or from the sensors monitoring the assets. An example data aggregator is McAfee ePolicy Orchestrator®, available from McAfee® of Santa Clara, Calif., and Solidcore® products including S3 Control Product Comparison, POS Check & Control, and/or PCI Pro, available form McAfee of Santa Clara, Calif., Alternatively, the vulnerability data source(s) 224 can be the assets and/or sensors themselves. When the vulnerability data source(s) 224 are the assets and/or sensors themselves, the vulnerability data is not aggregated when it is received by the network asset prioritizer 102, and the network asset prioritizer 102 aggregates the data itself.

The vulnerability detection data for a given asset specifies what tests were run by sensors protecting the asset, as well as the outcome of those tests. Example tests include virus scans, vulnerability analyses, system configuration checks, policy compliance checks, network traffic checks (e.g., provided by a firewall, a network intrusion detection system, or a network intrusion prevention system), and tests performed by host-based intrusion prevention systems or host-based intrusion detection systems. The vulnerability detection data identifies which vulnerabilities an asset is susceptible to, and which vulnerabilities an asset is protected from.

§2.1.4 Countermeasure Detection Data

The countermeasure detection data is received from countermeasure source(s) 222. In general, the countermeasure detection data specifies, for a given asset, what countermeasures are in place to protect the asset. In some implementations, the countermeasure detection data also specifies what countermeasures are not protecting the asset. A countermeasure is not protecting an asset, for example, when it is not in place at all, or when it is in place to protect the asset but is not properly configured.

The countermeasure source(s) 222 are sources that store the settings of individual sensors in the network, as well as data specifying which assets are protected by which sensors. For example, the countermeasure source(s) 222 can be one or more computers that receive data about the protection provided by sensors in the network and data about which sensors protect which assets. The countermeasure source(s) 222 aggregate the data to determine which countermeasures are in place to protect each asset. An example countermeasure data source is McAfee ePolicy Orchestrator®, available from McAfee® of Santa Clara, Calif. Example settings include an identification of the product providing the countermeasure, a product version, and product settings. Other example settings include one or more signatures of threats (e.g., file signatures or network traffic signatures) that are blocked by the countermeasure.

§2.2 Example Dimensional Priority Factors

Example dimensional priority factor data include, but are not limited to, asset type factor data 202, environmental factor data 204, traffic factor data 206, vulnerability factor data 208, compliance factor data 210, data loss prevention factor data 212, and service factor data 214.

§2.2.1 Asset Type Factors

For asset type factors, the classification metrics define one or more asset types, and each dimensional rule for the asset type factor defines an asset factor for an asset based on a matching of the asset types to which the asset is categorized to the one or more asset types defined by the dimensional rule.

Table 1 below shows an example dimensional dictionary for an asset type factors, and an example priority scheme.

TABLE 1

| Base/Max Priority Value | 10 |
| Dictionary Classification Metrics | |
| DHCP Server | 2/10 |
| Mail Server | 7/10 |
| Private IP | 5/10 |
| Public IP | 7/10 |
| SAP Server | 8/10 |
| Database Server | 8/10 |
| Sharepoint Server | 7/10 |
| LDAP/Active Directory | 8/10 |
| Gateway Device | 10/10 |

The example dictionary for the asset type factors is configurable. In some implementations, the example dictionary is a default dictionary, and an information technology administrator can configure the maximum priority value, base scores for each type, and add more asset types.

The number for each metric is a priority rating value. For asset type factors, the dimensional rules prioritize the asset based on the asset types. For example, in some implementations, the asset is prioritized according to a sum (or some other function) of the applicable classification metrics, e.g.:

P1=f(Mail Server, Database Server)
P2=f(Sharepoint Server, LDAP Server)

For example, an asset that is both a mail server and a database server is higher priority than an asset that is just an LDAP server. In these implementations, an asset is associated with a rational number that is the sum (or some other function) of its applicable classification metrics.

In other implementation, rules can be Boolean:

P1→(Mail Server AND Database Server)
P2→(Sharepoint Server AND LDAP)

Thus, an asset that is a Mail Server and a Database would have a Boolean value corresponding to asset factor P1 of True, and a Boolean value corresponding to asset factor P2 as false.

In some implementations, Boolean asset factors are prioritized according to a function of the underlying priority values of each classification metric. In other implementations, Boolean asset factors are prioritized according to a predefined scheme determined by the information technology administrator, e.g., P1>P2>P3, etc. For example, an administrator of a sales company may prioritize a factor related to a mail server as a highest priority; conversely, an administrator of a company that warehouses data may prioritize a factor related to a database server as a highest priority; a private IP asset may be lower in priority than a public IP asset as the public IP asset is used to interface to the public; etc.

§2.2.2 Environmental Factors

For environmental factors, the classification metrics define one or more environment types. Each environmental type describes an operational environment in which an asset can be deployed. Each dimensional rule for the environmental factor defines an asset factor for an asset based on a matching of one or more operational environments of an asset to the one or more environmental types defined by the dimensional rule.

Table 2 below shows an example dimensional dictionary for environmental factors, and an example priority scheme.

TABLE 2

| Base/Max Priority Value | 10 |
|---|---|
| Dictionary Classification Metrics | |
| Datacenter (VLAN's, CIDR's, zones . . . ) | 2/10 |
| Critical VLANS (Production servers, databases . . . ) | 7/10 |
| Critical subnets/zones | 5/10 |
| Server Farm | 7/10 |
| Manage Hosts | 8/10 |
| Unmanaged Hosts | 8/10 |
| Rogue Systems | 7/10 |

The example dictionary for the environmental type factors is configurable. In some implementations, the example dictionary is a default dictionary, and an information technology administrator can configure the maximum priority value, base scores for each type, and add more environmental types.

For environmental factors, the dimensional rules prioritize the asset based on the environmental types. For example, in some implementations, the asset is prioritized according to a sum (or some other function) of the applicable classification metrics, e.g.:

E1=f(Critical Subnet, Unmanaged Host)
E2=f(Critical Subnet, Rogue System)

For example, an asset that is both on a critical subnet and is an unmanaged host (i.e., an asset without an agent 108) has a higher priority than an asset that is on the critical subnet and is a rogue system. In these implementations, an asset is associated with a rational number that is the sum (or some other function) of its applicable classification metrics.

In other implementation, rules can be Boolean:

E1→(Critical Subnet AND Unmanaged Host)
E2→(Critical Subnet AND Rogue System)

In some implementation, Boolean asset factors are prioritized according to a function of the underlying priority values of each classification metric. In other implementations, Boolean asset factors are prioritized according to a predefined scheme determined by the information technology administrator, e.g., E1>E2>E3, etc.

§2.2.3 Traffic Factors

For traffic factors, the classification metrics define one or more traffic conditions. Each traffic condition describes a traffic pattern that can be observed in an asset. Each dimensional rule for the traffic factor defines an asset factor for an asset based on a matching of one or more observed traffic patterns in an asset to the one or more traffic conditions defined by the dimensional rule.

Table 3 below shows an example dimensional dictionary for traffic factors and corresponding conditions, and example base traffic values.

TABLE 3

| Base Values | |
|---|---|
| Source Reputation | Max: 5; Min: 0 |
| Default Alert Thresholds: | Max: 10; High: 5; Med: 8: Low: Max |
| Default Download Threshold: | 50 MB |
| Default Upload Threshold: | 25 MB |
| Dictionary Classification Metrics | |
| Anomalous Behavior Detected | Yes/No |
| Worm Activity Detected | Yes/No |
| Botnet Activity Detected | Yes/No |
| Alerts (Inbound Attacks) | Count |
| Alerts (Outbound Attacks) | Count |
| Total Downloads | Count |
| Total Uploads | Count |
| Source Reputation | Reputation |

The example dictionary for the traffic type factors is configurable. In some implementations, the example dictionary is a default dictionary, and an information technology administrator can configure the count values, thresholds, and add additional traffic factors.

The base values are examples of traffic related factors that the administrator can select for measuring traffic factors. The reputation base value relates to the reputation of an entity sending communications to an asset or to which the asset is sending communications. Reputations may have a range, as shown in Table 3. The reputations can be obtained from various security systems. Alternatively, the reputations may be binary, e.g., zero for entities on a blacklist (e.g., a list of known proxy sites and malware sites), and one for all other entities.

The default alert thresholds are thresholds that indicate anomalous and/or high risk traffic patterns observed over a monitoring time period, and are based on the severity of each observed event. For example, some events may be indicative of high risks, such as malware-related traffic. Other events may be indicative of low risks, such as instant messaging. At any time, observing a maximum number of alerts results in an indication of anomalous and/or high risk traffic patterns. Likewise, an observation of five high risk alerts results in an indication of anomalous and/or high risk traffic patterns, as does 8 medium risks and 10 low risk alerts.

Upload and download thresholds are also listed. The observation of an excess of 50 MB of downloads or 25 MB of uploads during a monitoring period results in an indication of anomalous and/or high risk traffic patterns.

Traffic factor metrics can also be relative. For example, if an asset has more alerts or much more traffic relative to other assets, then the asset is prioritized higher than the other assets. Likewise, if an asset has more download and/or upload activity relative to other assets, the asset is prioritized higher than the other assets-perhaps the asset is preforming critical functions for the enterprise relative to other assets, or perhaps the asset is under control by a malicious process. For either assumption, the performing security processes on the asset becomes more important.

The above base value are examples only, and more or fewer values can be used, and the default magnitudes of each value can be adjusted.

The dictionary lists various classification metrics that are measured for each asset. The network asset prioritizer 102 receives, from various security systems, data that indicates whether an assets has anomalous behavior detected (e.g., any behavior out of a normal system behavior), worm activity detected, botnet activity detected, the number of inbound attack alerts, the number of outbound attack alerts, the total download size, the total upload size, and source reputations of entities communicating with the asset. The activities detected and the alerts can also be characterized as high risk, medium risk and low risk. Likewise, the downloads and uploads can be characterized as malicious, normal and unknown. In some implementations, the data size for normal downloads and uploads is ignored.

For traffic factors, the dimensional rules prioritize the asset based on the traffic factors observed the asset. In some implementations, the rules are Boolean:

TR1→(Worm Activity Detected AND Alerts Generated>Threshold)
TR2→(Worm Activity Detected AND Alerts Generated<Threshold)
TR3→(Reputation=0|1|2 AND (Download>Threshold)

In some implementations, Boolean asset factors are prioritized according to a predefined scheme determined by the information technology administrator, e.g., TR1>TR2>TR3, etc. For example, an administrator of a company that develops software may prioritize a traffic factor related to uploads and/or data leakage as a highest priority; conversely, an administrator of a company that warehouses data may prioritize a traffic factor related to worm activity as a highest priority.

In other implementations, a priority value can be associated with each classification metric (e.g., a score from 1-10), and the assets are prioritized according to a function of the underlying priority values of each classification metric, e.g., TR1=f(Worm Activity Detected, Alerts Generated>Threshold)
TR2=(Worm Activity Detected, Alerts Generated<Threshold)
TR3=(Reputation=0|1|2, Download>Threshold)

§2.2.4 Vulnerability Factors

For vulnerability factors, the classification metrics define one or more vulnerability conditions, and each vulnerability condition describes a vulnerability observed in an asset, i.e., a vulnerability that the asset is susceptible to. The vulnerabilities can be rated according to severity, e.g., high, medium and low. Each dimensional rule for the vulnerability factor defines an asset factor for an asset based on a matching of one or more observed vulnerabilities of an asset to the one or more vulnerabilities conditions defined by the dimensional rule.

Table 4 below shows an example dimensional dictionary for vulnerability factors and corresponding conditions.

TABLE 4

| Dictionary Classification Metrics | |
| --- | --- |
| Vulnerability Threshold | 10 |
| High Risk Vulnerability Threshold | 3 |
| Medium Risk Vulnerability Threshold | 5 |
| Low Risk Vulnerability Threshold | 10 |
| Web Application Vulnerabilities | 7 |
| E-Mail Application Vulnerabilities | 7 |

The example dictionary for the vulnerability factors is configurable. In some implementations, the example dictionary is a default dictionary, and an information technology administrator can configure the vulnerability factors measured and the thresholds.

The default alert thresholds are condition thresholds that are associated with vulnerability types. For example, the threshold for high risk vulnerabilities is 3; thus, any asset that is vulnerable to three or more high risk vulnerability meets this condition. Likewise, vulnerability thresholds can be associated with a type, e.g., web application vulnerabilities and e-mail application vulnerabilities.

The network asset prioritizer 102 receives, from various security systems, the vulnerability data for the assets and applies dimensional rules to the data. For traffic factors, the dimensional rules prioritize the asset based on the vulnerabilities to which the asset is susceptible. In some implementations, the rules are Boolean:

RR1→(High Risk Vulnerabilities>Threshold)
RR2→(Med Risk Vulnerabilities>Threshold)
RR3→(Web Application Vulnerabilities>Threshold)
RR4→(Low Risk Vulnerabilities>Threshold)

In some implementations, Boolean asset factors are prioritized according to a predefined scheme determined by the information technology administrator, e.g., RR1>RR2>RR3, etc. For example, an administrator of a company that develops software may prioritize a vulnerability factor related to keyboard capturing software as a highest priority; conversely, an administrator of a company that warehouses data may prioritize a vulnerability factor related to worm activity as a highest priority.

In other implementations, a priority value can be associated with each classification metric (e.g., a score from 1-10), and the assets are prioritized according to a function of the underlying priority values of each classification metric, e.g., RR1=f(High Risk Vulnerabilities>Threshold)
RR2=f(Med Risk Vulnerabilities>Threshold)
RR3=f(Web Application Vulnerabilities>Threshold)
RR4=f(Low Risk Vulnerabilities>Threshold)

§2.2.5 Compliance Factors

For compliance factors, the classification metrics define one or more compliance condition, and each compliance condition describes a compliance requirement for an asset. Each dimensional rule for a compliance factor defines an asset factor for an asset based on a matching of one or more compliance requirements for an asset to the one or more compliance requirements defined by the dimensional rule.

Table 5 below shows an example dimensional dictionary for compliance factors and corresponding ratings.

TABLE 5

| Base/Max Priority Value | 10 |
| --- | --- |
| Dictionary Classification Metrics | |
| HIPPA Compliance | 5 |
| SOX Compliance | 5 |
| PCI Compliance | 5 |
| System (Windows/Unix/Solaris) | 10 |

The example dictionary for the compliance factors is configurable. In some implementations, the example dictionary is a default dictionary for a given set of compliance factors, and an information technology administrator can configure which compliance factors are considered.

The number for each compliance factor is a priority rating value. The rating value specifies the priority rating of an asset if the asset is not in compliance with a compliance metric. For example, in Table 5, an asset has rating of five if it is not in compliance with one of Health Insurance Portability and Accountability Act (HIPPA) compliance requirements, Sarbanes Oxley Act (SOX) compliance requirements, or Payment Card Industry (PCI) compliance requirement, and has a rating of 10 if the asset is not in compliance with operating system compliance requirements. The first three metrics relate to governmental or standards compliance regulations, and the last metric relates to a self-imposed enterprise compliance standard.

The network asset prioritizer 102 receives, from various security systems, the compliance data for the assets and applies dimensional rules to the data. For compliance factors, the dimensional rules prioritize the asset based on the non-compliance conditions observed for the asset. In some implementations, the rules are Boolean:

CR1→(HIPPA==0 AND PCI==0)
CR2→(PCT==0 AND SOX==0)
CR3→(ALL=0)

In some implementations, Boolean asset factors are prioritized according to a predefined scheme determined by the information technology administrator, e.g., CR1>CR2>CR3, etc. In some implementations, Boolean asset factors are prioritized according to a function of the underlying priority values of each classification metric.

§2.2.6 Data Loss Prevention Factors

For data loss prevention factors, the classification metrics define one or more data loss prevention conditions. Each data loss prevention condition describes a data loss prevention condition that can be observed in an asset, e.g., lack of password protection to an asset, instant messaging sessions, e-mails that include sensitive information as attachments and sent over unsecured networks, etc. Each dimensional rule for the data loss prevention factor defines an asset factor for an asset based on a matching of one or more observed data loss prevention of an asset to the one or more data loss prevention conditions defined by the dimensional rule.

Table 6 below shows an example dimensional dictionary for vulnerability factors and corresponding conditions.

TABLE 6

| Dictionary Threshold Metric | |
|---|---|
| MAX DLP Notifications | 20 |
| MAX DLP Network Leak Notifications | 10 |
| MAX Solidcore Violations | 10 |

The default alert thresholds are thresholds that indicate the number of data loss prevention conditions observed over a monitoring time period. At any time, observing a maximum number of alerts results in the corresponding threshold metric being met.

For data loss prevention factors, the dimensional rules prioritize the asset based on the data loss prevention factors observed the asset. In some implementations, the rules are Boolean:

DL1→(Notifications received>MAX DLP Notifications)
DL2→(Solidcore Violations>Max Solidcore Violations)
DL3→(DLP Network Leak Notifications>MAX DLP Network Leak Notifications)

In some implementations, Boolean asset factors are prioritized according to a predefined scheme determined by the information technology administrator, e.g., DL1>DL2>DL3, etc. In other implementations, a priority value can be associated with each classification metric (e.g., a score from 1-10), and the Boolean asset factors are prioritized according to a function of the underlying priority values of each classification metric.

In other implementations, a priority value can be associated with each classification metric (e.g., a score from 1-10), and the assets are prioritized according to a function of the underlying priority values of each classification metric, e.g., DL1=f(Notifications received>MAX DLP Notifications)
DL2=f(Solidcore Violations>Max Solidcore Violations)
DL3=f(DLP Network Leak Notifications>MAX DLP Network Leak Notifications)

§2.2.7 Service Factors

For service factors, the classification metrics define one or more service types. Each service type describes a network service that the asset performs. Each dimensional rule for a service factor defines an asset factor for an asset based on a matching of the of one or more network services the asset performs to the one or more service types defined by the dimensional rule.

Table 7 below shows an example dimensional dictionary for service factors.

TABLE 7

| Base/Max Priority Value | 10 |
|---|---|
| Dictionary Classification Metrics | |
| SMTP Service | 8 |
| SNMP Service | 5 |
| NetBios Service | 7 |
| LDAP Service | 8 |

The example dictionary for the service factors is configurable. In some implementations, the example dictionary is a default dictionary for a given set of service factors, and an information technology administrator can configure which service factors are considered.

The number for each service factor is a priority rating value. The rating value specifies the priority rating of an asset if the asset performs the service. For example, in Table 7, an asset has rating of 8 if it performs an SMTP service, etc. If an asset performs multiple services, in some implementations, the asset is prioritized according to a sum of the priority ratings of the applicable classification metrics. For example, an asset that is both a mail server and an LDAP server is higher priority than an asset that performs and SNMP service. In these implementations, an asset is associated with a rational number that is the sum of its applicable classification metrics.

In other implementation, rules can be Boolean:
S1→(SMTP Service AND LDAP Service)
S2→(NetBIOS Service AND ANMP Service)

In some implementations, Boolean asset factors are prioritized according to a function of the underlying priority values of each classification metric. In other implementations, Boolean asset factors are prioritized according to a predefined scheme determined by the information technology administrator, e.g., S1>S2>S3, etc.

In other implementations, a priority value can be associated with each classification metric (e.g., a score from 1-10), and the assets are prioritized according to a function of the underlying priority values of each classification metric, e.g.,
S1=f(SMTP Service AND LDAP Service)
S2=f(NetBIOS Service AND ANMP Service)

§2.3 Composite Priority Factor

The composite factor data include composite rules and a composite priority factor rule. Each composite rule defines one or more asset factors determined from one or more of the corresponding dimensional rules as input and defining a composite factor as output. The composite priority factor rule, in turn, defines composite factors as input and a composite priority factor as output.

In operation, the network asset prioritizer 102 does the following for each asset. First, for each of the dimensional priority factors, the network asset prioritizer 102 determines corresponding asset factors for the asset based on the dimensional rules. Then, for each of the composite rules, the network asset prioritizer 102 determines composite factors for the asset based on the asset factors for the asset. Finally, for the composite priority factor rule, the network asset prioritizer 102 determines a composite priority factor for the asset based on the composite factors for the asset.

For example, assume the composite rules include the following:

CF1→(TR1 AND P1 AND E1 AND RR1 AND CR1 AND DL1 AND S1)
CF2→(P1 AND TR2 AND E2)
CF3→(P1 AND (CR2 OR TR1)

Additional composite rules can also be defined. In implementations in which the asset factors are rational numbers, each composite factor can likewise be a rational number, e.g., CF1=f(TR1, P1, E1, RR1, CR1, DL1, S1), etc.

Once the composite factors for each asset are determined, the network asset prioritizer 102 determines the composite priority factor for each asset. For example, in implementations in which the composite factors are Boolean values, the composite priority factor can be a sum of weights associate with each composite factor, e.g., $$CPF_{Asset\,i} = \Sigma (CF_i(W) * CF_i$$

The weights associated with each composite factor can be determines in a variety of ways. In some implementations, the weights are based on the underlying priority ratings of each asset factor that was determined to be true for each underlying composite factor rule. For example, assume the numeral n in each asset factor (e.g., TRn, Pn, En, etc.) is indicative of the priority of the asset factor for a particular dimension relative to other asset factors for that dimension. Consider the two composite factors:

$CF_i$=(TR1 AND P1 AND E1 AND RR1) and
$CF_{i+1}$=(TR1 AND P2 AND E2 AND RR1)

The composite factor $CF_i$ would have a higher weight than the composite factor $CF_{i+1}$ because the composite factor $CF_i$ considers the same asset factors but is true for only the presence of the highest ranked asset factors, while the composite factor $CF_{i+1}$ is true when the asset factor P2 is present. The weighting functions can be based on a central tendency of the ratings of the asset factors, or can be a monotonically increasing function that uses the ratings of the asset factors as input, or can be some other function.

In implementations in which the composite factors are rational values, the composite priority factor can be a sum composite factors, e.g., $$CPF_{Asset\,i} = \Sigma CF_i$$

Alternatively, the composite priority factor can be based on a central tendency of the ratings of the asset factors, or can be a monotonically increasing function that uses the ratings of the asset factors as input, or can be some other function.

Once the composite priority factors are determined, the network asset prioritizer 102 ranks the assets according to their corresponding composite priority factors to define an order by which the assets are to be subjected to one or more security processes.

§3.0 Example Process Flow

Figure 3:
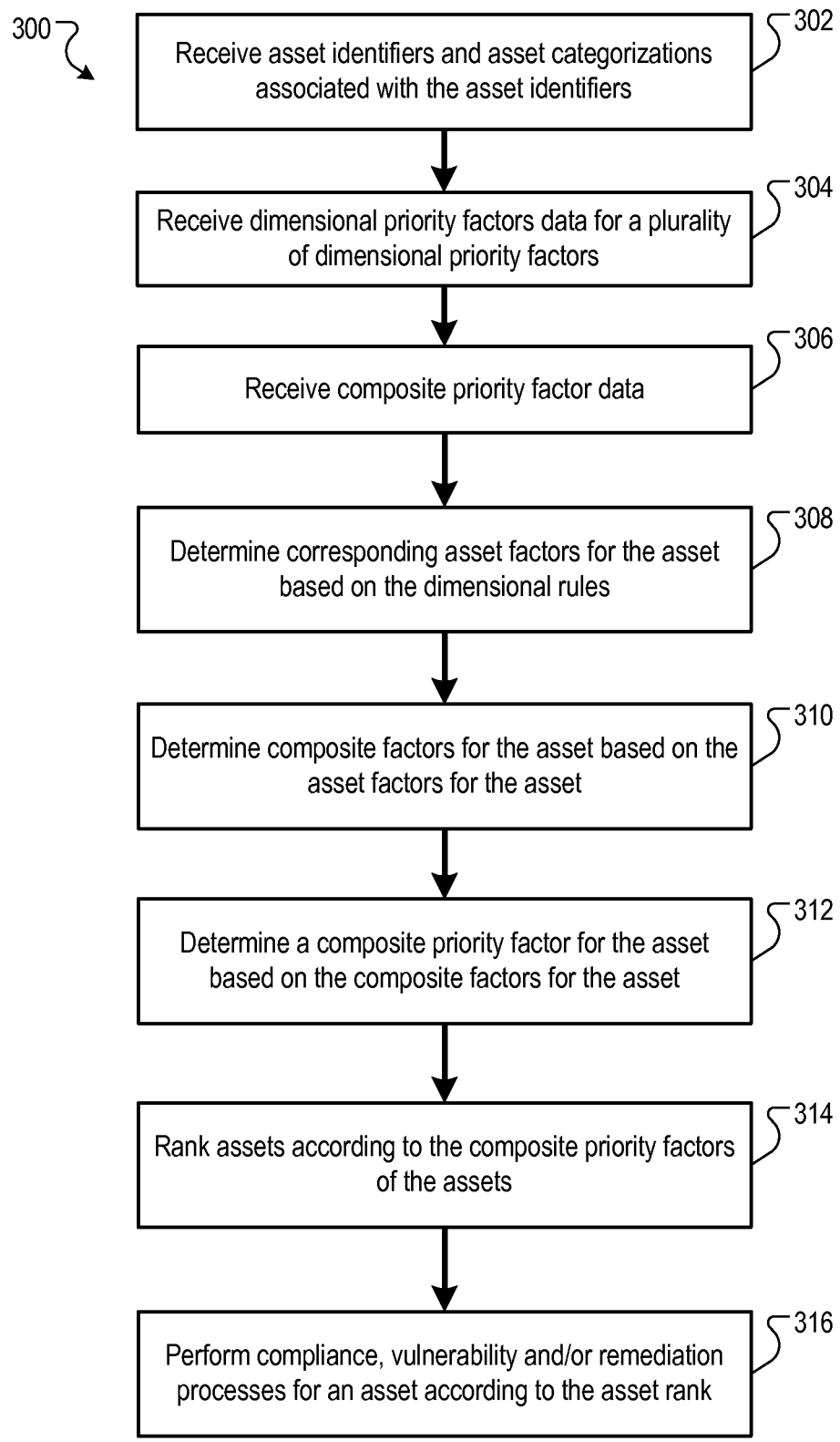
FIG. 3 is a flow diagram of an example process for prioritizing network assets.

FIG. 3 is a flow diagram of an example process 300 for prioritizing network assets. The process 300 can be implemented in the network asset prioritizer 102.

The process 300 receives asset identifiers and asset categorizations associated with the asset identifiers (302). Each asset is a network computer processing apparatus, and each asset identifier uniquely identifying a corresponding asset. The categorizations associated with each corresponding asset categorizing the asset as belonging to one or more asset types. Additional data, such as the configuration of each asset, and the vulnerabilities and countermeasures for each asset, can also be provided. The data received can, for example, be the asset configuration data, threat definition data, vulnerability detection data, and countermeasures detection data described in section 2.1 above.

The process 300 receives dimensional priority factors data for a plurality of dimensional priority factors (304). Data for each dimensional priority factor, in some implementations, includes a dimensional dictionary and dimension rules. The dimensional dictionary defines a plurality of classification metrics specific to the dimensional priority factor. Each classification metric define a metric to classify an asset as belonging to a classification. Each dimensional rule defines one or more of the classification metrics and asset specific data for an asset as input and defines an asset factor for the asset as an output based on the input. Example dimensional data is described in section 2.2 above, and any combination of the dimensional data described in section 2.2 above can be used.

The process 300 receives composite priority factor data (306). The composite priority factor data includes composite rules and a composite priority factor rule. Each composite rule defines one or more asset factors determined from one or more corresponding dimensional rules as input and defines a composite factor as output based on the input. The composite priority factor rule defines composite factors as input and a composite priority factor as an output based on the input. Example composite priority factor data is described in section 2.3 above.

For each asset, the process 300 determines corresponding asset factors for the asset based on the dimensional rules (308). For example, the dimensional rules described in section 2.2 are applied to the asset data received in step 302 to determine the asset factors for each asset.

For each asset, the process 300 determines composite factors for the asset based on the asset factors for the asset (310). For example, the process 300 applies the composite rules to the determined asset factors for each asset as described in section 2.3 above.

For each asset, the process 300 determines a composite priority factor for the asset based on the composite factors for the asset (312). For example, the process 300 applies the composite priority factor rule to the determined composite factors for each asset as described in section 2.3 above.

The process 300 ranks the assets according to their corresponding composite priority factor (314). The ranking defines an order by which the assets are to be subjected to one or more security processes.

The process 300 performs compliance, vulnerability and/or remediation processes for an asset according to the asset rank (316). For example, according to the asset rank, the most important assets may be tested and interrogated for one or more of compliance, vulnerability and/or remediation more often than less important assets.

§4.0 Example Uses of Composite Priority Factors

Once the network asset prioritizer 102 calculates the risk metrics, and aggregated risk metrics, as described above, the risk metrics and aggregated risk metrics can be used in various ways, such as prioritizing the performance compliance, vulnerability and/or remediation processes for assets, as described above.

In some implementations, the network asset prioritizer 102 allows users to view assets sorted according to the composite priority factors. Ranking assets according to the composite priority factor allows a user to quickly identify which assets are most critical for a system. The user (or an automated system having access to the asset prioritization data 120) can then perform compliance, security and vulnerability processes on the most critical assets.

FIG. 4 is an example user interface 400 presenting the top ranked assets according to the asset prioritization data for the assets. The user interface lists the names of the assets 402, sorted by the composite priority factor 404. Other information about the asset can alternatively, or additionally, be displayed in the user interface. In some implementations, a user can click on the name of an asset to be provided with additional information about the asset, such as the individual asset factors the network asset prioritizer found to be applicable to the asset, and broken down by corresponding dimensional factors, the dimensional rules satisfied by the asset, and the composite factors determined from the composite rules for the asset.

§5.0 Additional Implementation Details

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
   a data processing apparatus; and
   a computer storage medium coupled to the data processing apparatus and including instructions that when executed by the data processing apparatus causes the data processing apparatus to perform operations comprising:
   receiving asset identifiers and asset categorizations associated with the asset identifiers, each asset being a network computer processing apparatus, each asset identifier uniquely identifying a corresponding asset, and the asset categorizations associated with each corresponding asset categorizing the asset as belonging to one or more asset types;
   receiving dimensional priority factors data for a plurality of dimensional priority factors, each dimensional priority factor including:
      a dimensional dictionary defining a plurality of classification metrics specific to the dimensional priority factor, each classification metric defining a metric to classify an asset as belonging to a classification;
      a plurality of dimensional rules for the dimensional priority factor, each dimensional rule defining one or more of the classification metrics and asset specific data for an asset as input and defining an asset factor for the asset based on the input;
   receiving composite priority factor data, the composite priority factor data including:
      a plurality of composite rules, each composite rule defining one or more asset factors determined from one or more corresponding dimensional rules as input and defining a composite factor based on the input; and
      a composite priority factor rule that defines composite factors as input and a composite priority factor based on the input;
   for each of the assets:
      for each of the dimensional priority factors, determining corresponding asset factors for the asset based on the dimensional rules;
      for each of the composite rules, determining composite factors for the asset based on the asset factors for the asset, wherein each composite factor has a Boolean value and an associated weight; and
      determining a composite priority factor for the asset based on the composite factors for the asset, wherein determining a composite priority factor includes summing the associated weights of each composite factor having a true Boolean value; and
   ranking the assets according to their corresponding composite priority factors to define an order by which the assets are to be subjected to one or more security processes.

2. The system of claim 1, wherein:
   one of the dimensional priority factors is an asset type factor;
   the classification metrics for the asset type factor define one or more asset types; and
   each dimensional rule for the asset type factor defines an asset factor for an asset based on a matching of the asset types to which the asset is categorized to the one or more asset types defined by the dimensional rule.

3. The system of claim 2, wherein the asset types include DHCP server, mail server, database server, web server, public IP, and private IP.

4. The system of claim 1, wherein:
   one of the dimensional priority factors is an environmental factor;
   the classification metrics for the environmental factor define one or more environment types, each environmental type describing an operational environment in which an asset can be deployed; and
   each dimensional rule for the environmental factor defines an asset factor for an asset based on a matching of one or more operational environments of an asset to the one or more environmental types defined by the dimensional rule.

5. The system of claim 4, wherein the environmental types include managed host, unmanaged host, and critical subnets.

6. The system of claim 1, wherein:
   one of the dimensional priority factors is a traffic factor;
   the classification metrics for the traffic factor define one or more traffic conditions, each traffic condition describing a traffic pattern that can be observed in an asset; and
   each dimensional rule for the traffic factor defines an asset factor for an asset based on a matching of one or more observed traffic patterns in an asset to the one or more traffic conditions defined by the dimensional rule.

7. The system of claim 6, wherein the traffic types include worm activity, inbound attacks and output attacks.

8. The system of claim 1, wherein:
one of the dimensional priority factors is a vulnerability factor;
the classification metrics for the vulnerability factor define one or more vulnerability conditions, each vulnerability condition describing a vulnerability observed in an asset; and
each dimensional rule for the vulnerability factor defines an asset factor for an asset based on a matching of one or more observed vulnerabilities of an asset to the one or more vulnerabilities conditions defined by the dimensional rule.

9. The system of claim 1, wherein:
one of the dimensional priority factors is a compliance factor;
the classification metrics for the compliance factor define one or more compliance conditions, each compliance condition describing a compliance requirement for an asset; and
each dimensional rule for the compliance factor defines an asset factor for an asset based on a matching of one or more compliance requirements for an asset to the one or more compliance requirements defined by the dimensional rule.

10. The system of claim 9, wherein the compliance requirements include regulatory compliance defined by regulatory entities.

11. The system of claim 1, wherein:
one of the dimensional priority factors is a data loss prevention factor;
the classification metrics for the data loss prevention factor define one or more data loss prevention conditions, each data loss prevention condition describing a data loss prevention that can be observed in an asset; and
each dimensional rule for the data loss prevention condition defines an asset factor for an asset based on a matching of one or more data loss prevention conditions observed in an asset to the one or more data loss prevention conditions defined by the dimensional rule.

12. The system of claim 1, wherein:
one of the dimensional priority factors is an service type factor;
the classification metrics for the service type factor define one or more service types, each service type describing a network service that the asset performs; and
each dimensional rule for the service type factor defines an asset factor for an asset based on a matching of the of one or more network services the asset performs to the one or more service types defined by the dimensional rule.

13. The system of claim 12, wherein the service types include SMTP service, SNMP service, and LDAP service.

14. The system of claim 1, wherein:
each dimensional rule is a Boolean rule and each asset factor is a Boolean value;
each composite rule is a Boolean rule.

15. The system of claim 1, wherein:
each asset factor is a rational number;
each composite factor is rational number; and
determining a composite priority factor for the asset based on the composite factors for the asset comprises summing the composite factors for the asset.

16. The system of claim 1, wherein:
the dimensional priority factors include an asset type factor, an environmental factor, a traffic factor, and a vulnerability factor;
the classification metrics for the asset type factor define one or more asset types;
each dimensional rule for the asset type factor defines an asset factor for an asset based on a matching of the asset types to which the asset is categorized to the one or more asset types defined by the dimensional rule;
the classification metrics for the environmental factor define one or more environment types, each environmental type describing an operational environment in which an asset can be deployed;
each dimensional rule for the environmental factor defines an asset factor for an asset based on a matching of one or more operational environments of an asset to the one or more environmental types defined by the dimensional rule;
the classification metrics for the traffic factor define one or more traffic conditions, each traffic condition describing a traffic pattern that can be observed in an asset;
each dimensional rule for the traffic factor defines an asset factor for an asset based on a matching of one or more observed traffic patterns in an asset to the one or more traffic conditions defined by the dimensional rule;
the classification metrics for the vulnerability factor define one or more vulnerability conditions, each vulnerability condition describing a vulnerability observed in an asset; and
each dimensional rule for the vulnerability factor defines an asset factor for an asset based on a matching of one or more observed vulnerabilities of an asset to the one or more vulnerabilities conditions defined by the dimensional rule.

17. A computer-implemented method comprising:
receiving asset identifiers and asset categorizations associated with the asset identifiers, each asset being a network computer processing apparatus, each asset identifier uniquely identifying a corresponding asset, and the asset categorizations associated with each corresponding asset categorizing the asset as belonging to one or more asset types;
receiving dimensional priority factors data for a plurality of dimensional priority factors, each dimensional priority factor including:
a dimensional dictionary defining a plurality of classification metrics specific to the dimensional priority factor, each classification metric defining a metric to classify an asset as belonging to a classification;
a plurality of dimensional rules for the dimensional priority factor, each dimensional rule defining one or more of the classification metrics and asset specific data for an asset as input and defining an asset factor for the asset based on the input;
receiving composite priority factor data, the composite priority factor data including:
a plurality of composite rules, each composite rule defining one or more asset factors determined from one or more corresponding dimensional rules as input and defining a composite factor based on the input; and
a composite priority factor rule that defines composite factors as input and a composite priority factor based on the input;
for each of the assets:
for each of the dimensional priority factors, determining, using at least one data processing apparatus, corresponding asset factors for the asset based on the dimensional rules;
for each of the composite rules, determining, using at least one data processing apparatus, composite factors for the asset based on the asset factors for the asset, wherein each composite factor has a Boolean value and an associated weight; and determining, using at least one data processing apparatus, a composite priority factor for the asset based on the composite factors for the asset, wherein determining a composite priority factor includes summing the associated weights of each composite factor having a true Boolean value; and ranking, using at least one data processing apparatus, the assets according to their corresponding composite priority factors to define an order by which the assets are to be subjected to one or more security processes.

18. The method of claim 17, wherein:
the dimensional priority factors include an asset type factor, an environmental factor, a traffic factor, and a vulnerability factor;
the classification metrics for the asset type factor define one or more asset types;
each dimensional rule for the asset type factor defines an asset factor for an asset based on a matching of the asset types to which the asset is categorized to the one or more asset types defined by the dimensional rule;
the classification metrics for the environmental factor define one or more environment types, each environmental type describing an operational environment in which an asset can be deployed;
each dimensional rule for the environmental factor defines an asset factor for an asset based on a matching of one or more operational environments of an asset to the one or more environmental types defined by the dimensional rule;
the classification metrics for the traffic factor define one or more traffic conditions, each traffic condition describing a traffic pattern that can be observed in an asset;
each dimensional rule for the traffic factor defines an asset factor for an asset based on a matching of one or more observed traffic patterns in an asset to the one or more traffic conditions defined by the dimensional rule;
the classification metrics for the vulnerability factor define one or more vulnerability conditions, each vulnerability condition describing a vulnerability observed in an asset; and
each dimensional rule for the vulnerability factor defines an asset factor for an asset based on a matching of one or more observed vulnerabilities of an asset to the one or more vulnerabilities conditions defined by the dimensional rule.

19. The method of claim 17, wherein:
each dimensional rule is a Boolean rule and each asset factor is a Boolean value; and
each composite rule is a Boolean rule.

20. Software instructions stored on a computer readable memory storage device executable by a data processing apparatus and upon such execution cause the data processing apparatus to perform operations comprising:
receiving asset identifiers and asset categorizations associated with the asset identifiers, each asset being a network computer processing apparatus, each asset identifier uniquely identifying a corresponding asset, and the categorizations associated with each corresponding asset categorizing the asset as belonging to one or more asset types;
receiving dimensional priority factors data for a plurality of dimensional priority factors, each dimensional priority factor including:
a dimensional dictionary defining a plurality of classification metrics specific to the dimensional priority factor, each classification metric defining a metric to classify an asset as belonging to a classification;
a plurality of dimensional rules for the dimensional priority factor, each dimensional rule defining one or more of the classification metrics and asset specific data for an asset as input and defining an asset factor for the asset based on the input;
receiving composite priority factor data, the composite priority factor data including:
a plurality of composite rules, each composite rule defining one or more asset factors determined from one or more corresponding dimensional rules as input and defining a composite factor based on the input; and
a composite priority factor rule that defines composite factors as input and a composite priority factor based on the input;
for each of the assets:
for each of the dimensional priority factors, determining corresponding asset factors for the asset based on the dimensional rules;
for each of the composite rules, determining composite factors for the asset based on the asset factors for the asset, wherein each composite factor has a Boolean value and an associated weight; and
determining a composite priority factor for the asset based on the composite factors for the asset, wherein determining a composite priority factor includes summing the associated weights of each composite factor having a true Boolean value; and
ranking the assets according to their corresponding composite priority factors to define an order by which the assets are to be subjected to one or more security processes.

* * * * *